UNITED STATES PATENT OFFICE.

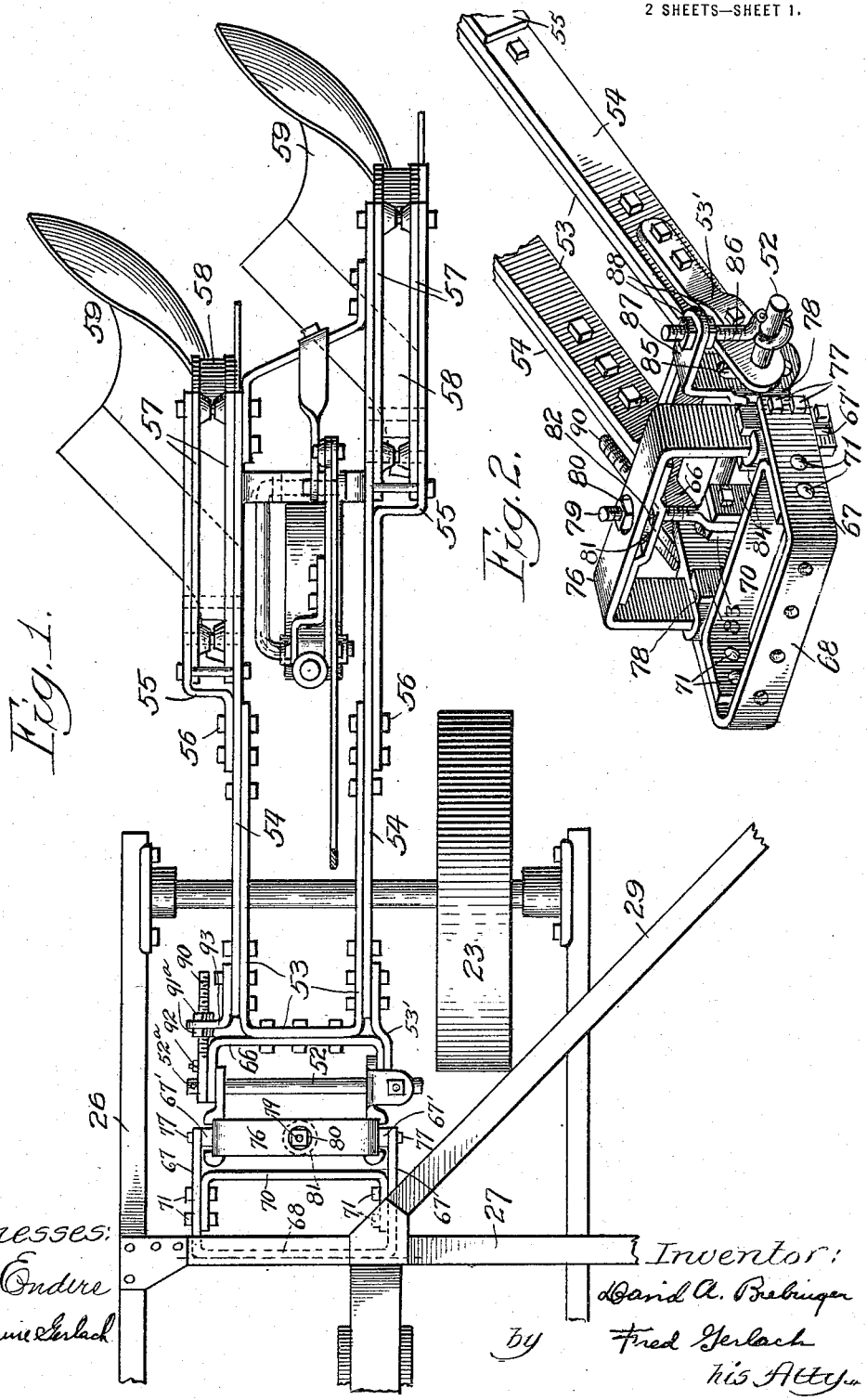

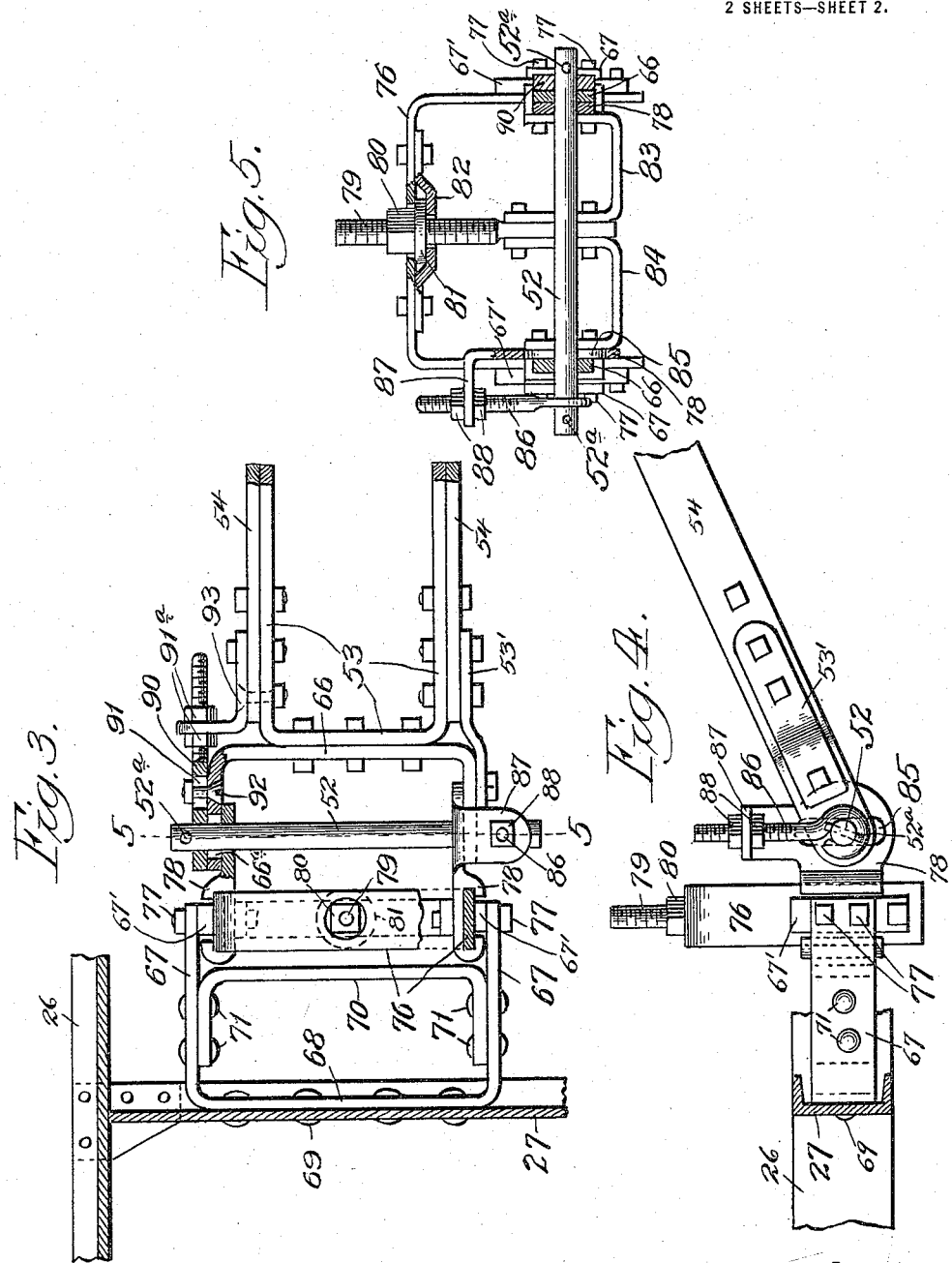

DAVID A. BIEBINGER, OF MOLINE, ILLINOIS, ASSIGNOR TO LA CROSSE PLOW CO., OF LA CROSSE, WISCONSIN, A CORPORATION OF WISCONSIN.

PLOW.

1,175,042.  Specification of Letters Patent. Patented Mar. 14, 1916.

Original application filed August 24, 1912, Serial No. 716,925. Divided and this application filed November 10, 1913. Serial No. 800,055.

*To all whom it may concern:*

Be it known that I, DAVID A. BIEBINGER, (formerly of La Crosse, Wisconsin,) a resident of Moline, in the county of Rock Island and State of Illinois, have invented certain new and useful Improvements in Plows, of which the following is a full, clear, and exact description.

The invention relates to plows and more particularly to the adjustable connections or couplings between the plow beam and the frame.

The invention designs to provide an improved adjustable coupling or connection between the beam and the frame, whereby the several adjustments desired to cause the plowshares or bottoms to travel at the desired angle or level in the ground may be made.

The improvements herein shown may be applied to a plow of the type shown in my application for Letters Patent, filed August 24, 1912, Serial No. 716,925, of which the present application is a division.

The invention consists in the several novel features hereinafter set forth and more particularly defined by claims at the conclusion hereof.

In the drawings: Figure 1 is a plan of a portion of a plow embodying the invention. Fig. 2 is a perspective of the adjustable plow beam and coupling. Fig. 3 is a plan of the coupling, parts being shown in section. Fig. 4 is a side elevation of the improved coupling. Fig. 5 is a section taken on line 5—5 of Fig. 3.

The invention is illustrated as applied to the frame of a tractor-plow comprising a cross-bar 27, a side-bar 26, and a diagonal bar 29. A carrying-wheel 23 serves to support that portion of the frame, which is shown, it being understood that additional carrying-wheels are provided where necessary. This frame is usually adapted to operate a series of plow-beams, only one of which is illustrated.

The beam is pivotally connected at its front end by a pin 52 to permit the plow-bottoms, carried by said beam, to be raised out of and lowered into, the ground. The beam is made up of wrought metal bars to provide a strong and durable construction and each comprises a U-shaped bar 53 to each side of which a side bar 54 is secured. To the outer side of each bar 54, the front end of a bar 55 is secured by bolts 56 which secure bars 53 and bars 54 and 55 together. The rear end of each bar 55 is bent away or spaced from its bar 54, and between each pair of bars 54 and 55, there is a pair of brackets 57 between which a plow-standard 58, which carries a plowshare 59, is secured. A U-shaped bracket 66, through which the pin 52 extends, is secured to the front end of each beam-member 53 and is braced at one corner by a strap 53' connected to it and to the member 53. Pins 52$^a$, at the ends of pin 52, hold the latter against lateral displacement. The connection between pivot 52 and the main frame comprises a bar bent to form a pair of side-arms or members 67 and a connecting portion 68 which is shaped to fit into the channel in bar 27 and is secured thereto by rivets 69. A U-shaped bar 70 between arms 67 is secured thereto by rivets 71.

Connections are provided whereby the front end of each plow-carrying frame may be adjusted to level the plow-bottom transversely and whereby the pivot may be adjusted vertically to adjust the depth of the point of the plow, to vary the angle of the bottom and also to adjust the plow-bottom laterally to vary the angle of the landside relatively to the line of draft.

For the purpose of adjusting the depth of the plow point by raising and lowering pivot pin 52, an arch 76 is rigidly secured to the rear ends of arms 67 by bolts 77 and spaced therefrom by blocks 67'. Lugs 78, through which pin 52 passes, are mounted to slide vertically on the sides of arch 76, and an adjusting screw 79 is provided for bodily raising and lowering pin 52 relatively to the main plow-frame. A nut 80 is screw-threaded to screw 79 and is held against movement relatively to arch-bar 76, being provided with a flange 81, which is held between a bar 82 and to top of arch 76 to which bar 82 is secured. Rotation of nut 80, which can be done by the operator, when the plow is in operation, will raise or lower the adjusting-screw 79. Screw 79 is rigidly secured to one of the lugs 78 by a U-shaped bar 83 and to the other lug 78 by a similar bar 84. The latter lug 78 is formed with a slot 85 which is vertically elongated and through which one end of pivot-pin 52 passes. Said lug is connected to one end of pin 52 by an eye-bolt 86 which extends through a laterally projecting ear 87 on said lug 78 and is adjustably secured thereto by nuts 88 above and below said ear. Resultantly, adjustment of screw 79, by turning nut 80 will raise or lower said screw and brackets 83 and 84, lugs 78 and both ends of pin 52, without destroying the lateral angle of the plow-bottom.

By adjustment of screw 86 and by adjustment of nuts 88 thereon, one end of pivot pin 52 may be raised or lowered to tilt it laterally to level it laterally, as desired. At the opposite end of the pivot 52, a device is provided for adjusting the plow-beam to vary the angle of the landside relatively to the line of draft. This device consists of an eye-bolt 90, through the eye of which one end of pin 52 passes. A slot 66ª is formed in one side of bar 66 to permit fore and aft adjustment of one end of pin 52. Bolt 90 is slotted, as at 91, and a bolt 92 passes through said slot, to permit one end of pin 52 to be adjusted fore and aft, by nuts 91ª on the screw of bolt 90, which engage a lug 93, which is secured to the side of the front end of the plow-beam. These connections thus exemplify means for adjusting the point of the plow-body vertically, the landside of the plow-body relatively to the line of draft, and for leveling the plow-bottom.

The invention is not to be understood as restricted to the details set forth, since these may be modified within the scope of the appended claims, without departing from the spirit and scope of the invention.

Having thus described the invention, what I claim as new and desire to secure by Letters Patent, is:

1. In a plow, the combination of a frame, a plow-beam, a pin for pivotally connecting the beam to the frame, a vertically disposed arch on the frame to which the pin is connected, and a screw mounted in the arch for raising and lowering said pin bodily to adjust the pivotal connection between the beam and the frame.

2. In a plow, the combination of a frame, a plow-beam, a pin for pivotally connecting said beam to the frame, a screw for raising and lowering said pin bodily to adjust the pivotal connection between the beam and the frame, a flanged nut on the screw, and means for holding the nut against longitudinal movement.

3. In a plow, the combination of a frame, a plow-beam, a pin for pivotally connecting said beam to the frame, means between the pin and the beam for angularly adjusting the beam relatively to the pin to vary the angle of the landside of the plow body, and a screw for vertically adjusting the pin bodily.

4. In a plow, the combination of a frame, a plow-beam, a pin for pivotally connecting said beam to the frame, an eye-bolt between the beam and the pin for angularly adjusting the beam relatively to the pin to vary the angle of the landside of the plow body, and means for bodily adjusting the pin vertically.

5. In a tractor-plow, the combination of a frame, a plow-beam, a pin for pivotally connecting said beam to the frame to permit the beam to swing vertically, means for adjusting the pin angularly and vertically to adjust the bottom of the plow body angularly, and a screw-device for adjusting the pin bodily.

6. In a plow, the combination of a frame, a plow-beam, a pin for pivotally connecting the beam to the frame, an eye-bolt engaging one end of the pin for adjusting it angularly and vertically to adjust the bottom of the plow body angularly, and a screw-device for bodily raising and lowering the pin.

7. In a plow, the combination of a frame, a plow-beam, a pin for pivotally connecting said beam to the frame, means for adjusting the beam laterally to vary the angle of the landside of the plow, means for adjusting one end of the pin angularly to adjust the bottom of the plow body, and a screw for adjusting the pin bodily.

8. In a plow, the combination of a frame, a plow-beam, a pin for pivotally connecting said beam to the frame, an eye-bolt engaging one end of the pin to adjust the beam laterally to vary the angle of the landside of the plow body, an eye-bolt connected to the other end of the pin to angularly adjust the plow-beam and means for raising and lowering the pin bodily.

9. In a plow, the combination of a frame, a plow-beam, a pin for pivotally connecting said structure to the frame, an arch secured to the frame, lugs slidable vertically on the arch and carrying said pin, a screw secured to said lugs, and a nut held in the arch, for adjusting the screw to raise and lower the pin bodily.

10. In a plow, the combination of a frame, a plow-beam, a pin for pivotally connecting the beam to the frame, an arch secured to the frame, lugs slidably connected to the arch and carrying said pin, a screw secured to said lugs, a nut held in the arch for adjusting the screw to raise and lower the pin, and adjusting means between one of the lugs and the pin for varying the angle of the bottom of the plow-body.

11. In a plow, the combination of a frame, a plow-beam, a pin for pivotally connecting the beam to the frame, an arch secured to the frame, lugs slidably connected to the arch and carrying said pin, a screw secured to said lugs, a nut held in the arch for adjusting the screw to raise and lower the pin to vary the angle of the plow-body.

12. In a plow, the combination of a frame, a plow-beam, a pin for pivotally connecting the beam to the frame, an arch secured to the frame, lugs slidably connected to the arch and carrying said pin, a screw secured to said lugs, a nut held in the arch for adjusting the screw to raise and lower the pin, an adjustable connection between one of said lugs and one end of said pin for adjusting the beam relatively to the pin to vary the angle of the landside of the plow-body.

13. In a plow, the combination of a frame, a plow-beam, a pin for pivotally connecting said structure to the frame, a U-shaped bracket at the front of said beam having forwardly extending arms through which the said pin extends, one of said arms having a slot therein, and a screw having an eye through which one end of the pin extends, for adjusting the beam to vary the landside of the plow-body.

14. In a plow, the combination of a frame, a plow-beam, a pin for pivotally connecting the beam to the frame, a U-shaped bracket at the front of said beam, having forwardly extending arms through which said pin extends, one of said arms having a slot therein, a screw having an eye through which one end of the pin extends, for adjusting the beam to vary the landside of the plow-body, and an angular lug secured to the structure and through which said screw extends.

15. In a plow, the combination of a frame, a plow-beam, a pin for pivotally connecting said beam to the frame, a U-shaped bracket at the front of the beam, having forwardly extending arms through which said pin extends, an eye through which one end of the pin extends and for adjusting the beam to vary the landside of the plow body, an angular lug secured to the beam and through which said screw extends, and nuts on the said screw, engaging said angular lug.

16. In a plow, the combination of a frame, a plow-beam, a pin for pivotally connecting the beam to the frame, a U-shaped bracket at the front of the beam, having forwardly extending arms through which said pin extends, one of said arms having a slot therein, a screw having an eye through which one end of the pin extends, for adjusting the beam to vary the landside of the plow-body, and a bolt-and-slot-connection between said pin and one of the arms of said U-shaped bracket for adjusting the plow-body.

17. In a plow, the combination of a frame, a plow-beam, a pin for pivotally connecting the beam to the frame, an arch secured to the frame and having vertical members at its sides, lugs through which said pin extends, slidably mounted on said vertical arms, a screw mounted in the top of said arch, a nut for adjusting the screw held in the top of the arch, and U-shaped bars between the screw and said lugs.

18. In a plow, the combination of a frame, a plow-beam, a pin for pivotally connecting the beam to the frame, an arch secured to the frame and having vertical members at its sides, lugs through which said pin extends, slidably mounted on said vertical arms, a screw mounted in the top of said arch, a nut for adjusting the screw held in the top of the arch, U-shaped bars between the screw and said lugs, and an adjustable eye-bolt between one of the lugs and one end of said pin, for adjusting the angle of the bottom of the plow.

19. In a plow, the combination of a frame, a plow-beam, a pin for pivotally connecting the beam to the frame, an arch secured to the frame and having vertical members at its sides, lugs through which said pin extends, slidably mounted on said vertical arms, a screw mounted in the top of said arch, a nut for adjusting the screw, held in the top of the arch, U-shaped bars between the screw and said lugs, and an adjustable eye-bolt between one end of the pin and said structure for adjusting the angle of the landside of the plow.

DAVID A. BIEBINGER.

Witnesses:
  EDWARD L. EAGLE,
  F. E. DAVIS.